United States Patent [19]
Grulke et al.

[11] Patent Number: 5,421,865
[45] Date of Patent: Jun. 6, 1995

[54] WATER BASED SILICONE COATING COMPOSITIONS

[75] Inventors: David J. Grulke, South Windsor, Conn.; Marc E. Gage, Feeding Hills, Mass.

[73] Assignee: United Technologies Corporation, Hartford, Conn.

[21] Appl. No.: 145,078

[22] Filed: Oct. 29, 1993

[51] Int. Cl.6 ............................................... C09D 5/20
[52] U.S. Cl. ..................... 106/2; 106/38.22; 106/287.13; 106/287.14; 252/DIG. 1; 524/858; 524/860
[58] Field of Search .......... 524/35, 42, 43, 46, 524/858, 860; 106/2, 287.13, 287.14, 287.15, 287.16, 3, 10, 38.22; 252/DIG. 1

[56] References Cited

U.S. PATENT DOCUMENTS

| | | | |
|---|---|---|---|
| 3,847,622 | 11/1974 | Brandl et al. | 106/10 |
| 4,347,333 | 8/1982 | Lohr et al. | 106/3 |
| 4,383,062 | 5/1983 | Saad et al. | 524/35 |
| 4,518,727 | 5/1985 | Traver | 106/287.13 |
| 4,874,547 | 10/1989 | Narula | 106/287.13 |
| 5,264,027 | 11/1993 | Martin et al. | 106/287.14 |

*Primary Examiner*—Mark L. Bell
*Assistant Examiner*—Paul Marcantoni
*Attorney, Agent, or Firm*—Mary R. Bonzagni; Holland & Associates

[57] ABSTRACT

Water based silicone coating compositions are provided that offer superior coating properties, durability and resistance to high temperatures and to the effects of corrosive environments. These coating compositions are especially useful for coating the external and intricate internal surfaces of high temperature aluminum heat exchangers.

24 Claims, No Drawings

WATER BASED SILICONE COATING COMPOSITIONS

BACKGROUND OF THE INVENTION

This invention relates to coating compositions, and more particularly to water based silicone coating compositions that offer superior coating properties, resistance to high temperatures and to the effects of corrosive environments and durability. The present invention provides water based silicone coating compositions, methods for producing such compositions, as well as high temperature heat exchangers whose surfaces are coated with such water based silicone coating compositions.

Silicone resins are known to demonstrate endurance towards environmental conditions such as weathering and extreme heat and cold. For this reason these resins have been found to be particularly useful in the paint industry.

Previously, silicone resins were made available to formulators in organic solutions. In particular, the resin consisted of so many parts by weight of silicone solids in an organic solvent such as xylene or toluene. However, due to increased concerns regarding: the suspected health hazards to persons exposed to such solvents; environmental considerations and the mandatory use of costly and burdensome pollution abatement procedures and equipment; and escalating costs for organic materials, the use of such organic solvents has been discouraged. As a result, suppliers of these silicone resins have worked towards developing silicone resin systems that are water based and therefore not dependent upon organic solvents.

Yet, such silicone resins which have been found to be particularly useful in the paint industry have often been found to be immiscible or otherwise incompatible with aqueous coating compositions. For those silicone resins which can be made part of water based emulsions which can then form the basis of a paint or coating composition, the ability of these coatings to generally match the performance (e.g., coating properties) of other temperature-resistant protective coatings is oftentimes not realized. Moreover, such compositions do not serve to adequately protect the underlying substrate from the effects of corrosive environments.

For devices such as high temperature aluminum heat exchangers which have an intricate network of passages therethrough and which are oftentimes subjected to corrosive environments, the deficiencies of prior art water based coating compositions take on significant proportions.

It is, therefore, an object of the present invention to provide water based silicone coating compositions that offer superior coating properties and resistance to high temperatures.

It is another object of the present invention to provide novel coating compositions that exhibit durability and resistance to the effects of a corrosive environment.

It is yet another object to provide a process for producing such water based silicone coating compositions.

It is still another object of the present invention to provide a high temperature heat exchanger whose surfaces are coated with such water based silicone coating compositions.

SUMMARY OF THE INVENTION

The present invention therefore relates to a high temperature coating composition. The coating composition is comprised of: a silicone resin emulsion; a non-water reactive filler material having a laminar structure; a water soluble nonionic surfactant; and water.

The present invention also relates to a process for producing a high temperature coating composition as described above.

The present invention further relates to a high temperature heat exchanger whose external and intricate internal surfaces are coated with a coating composition as described above.

The foregoing and other features and advantages of the present invention will become more apparent from the following description.

DETAILED DESCRIPTION OF THE PREFERRED EMBODIMENTS

The coating compositions of the present invention are useful in a wide variety of applications, including use as high temperature protective coatings for aluminum parts used in the transportation industry, such as high temperature aluminum heat exchangers.

The inventive coating compositions generally will have a total weight percent solids content of approximately 30.4 to 55.7%; a pH range of 6.0 to 8.0; a viscosity of approximately 20 to 40 seconds as measured by a No. 1 Zahn Cup; a density of approximately 1.08 to 1.18 grams per cubic centimeter ($g/cm^3$); a volatile organic compounds content of less than 200 grams/liter; and a filler material (e.g. pigment) to resin solids (e.g. binder) ratio of approximately 1.0 to 2.2 through 1.0 to 4.2. The filler material to resin solids ratio indicates the quantity by weight of resin used with a specified amount of a particular filler material.

In general, the coating compositions of the present invention contain a silicone resin emulsion; a non-water reactive filler material having a laminar structure; a water soluble nonionic surfactant; and water.

The emulsion functions as a high heat resistant binder for the filler material and generally will have a total silicone resin solids content of approximately 38 to 82% by weight. The silicone resin emulsion is comprised of 100 parts by weight of (i) at least one silicone resin having one or more organic side groups attached such as phenyl, methyl, trifluoropropyl and/or vinyl moieties; (ii) an anionic surfactant effective for dispersing the resin in a water based emulsion and for binding the resin or particulate phase and the water or continuous phase; and (iii) an amount of water effective for providing a preselected silicone resin solids content by weight of the emulsion. The emulsion might also contain trace amounts of volatile organic compounds such as xylene and/or toluene present as a result of the manufacturing process.

Silicone resins, which may be used in the emulsion of the present inventive coating composition, include optionally crosslinked resins comprising units selected from the group consisting of $R_xSiO_y$ where x is 3, 2 or 1 and y is 0.5, 1.0 or 1.5 respectively, and where the R groups are phenyl, methyl, trifluoropropyl and/or vinyl. A typical number average molecular weight and weight average molecular weight of such resins are 420 and 2190, respectively. Preferred silicone resins include lightly crosslinked or soft phenylmethyl silicone resins and moderately to highly crosslinked or medium-hard phenylmethyl silicone resins. The most preferred silicone resin is medium-hard phenylmethyl silicone resin where an increase in the hardness and fluid resistance of the cured inventive coating composition has been observed when this moderately to highly crosslinked resin is used.

Anionic surfactants suitable for use in the silicone resin emulsion of the present inventive coating include sodium lauryl sulfate, sodium linear alkyl benzene sulfonate, triethanol amine linear alkyl benzene sulfonate, sodium alpha olefin sulfonate, ammonium alkyl phenol ethoxylate sulfate, ammonium lauryl ether sulfate, ammonium alkyl ether sulfate, dialkyl ester of sodium sulfosuccinic acid, sodium cumene sulfonate, and ammonium xylene sulfonate. The preferred anionic surfactant is sodium lauryl sulfate.

It will be recognized by those skilled in the art that the water used in the silicone resin emulsion of the present inventive coating is preferably distilled or deionized water.

The preferred silicone resin emulsion is comprised of (i) from 48 to 72 wt. % soft or medium-hard phenylmethyl silicone resin; (ii) from 0.01 to 1.0 wt. % sodium lauryl sulfate; and (iii) from 52 to 27 wt. % water, based on the total weight of the emulsion. The average viscosity of the preferred silicone resin emulsion is from about 40 to about 180 centipoises as measured in accordance with Method B of ASTM D 1084 using a Brookfield LVF. The preferred silicone resin emulsions are available from Dow Corning Corporation, Midland, Mi., under the product designations Dow Corning® 1-0468 resin emulsion and Dow Corning® 1-0469 resin emulsion.

The non-water reactive filler material of the present inventive coating has a laminar structure and functions to form a barrier from corrosive elements thereby protecting the substrate and serves to improve coating properties. Filler materials contemplated by the present invention include pigments in the form of a paste containing flake metal or mineral and a dispersant. These pigments in addition to functioning as a barrier from corrosive elements and improving coating properties also impart color to the coating composition and include such substances as inhibited aluminum leafing pigment dispersed in a hydrocarbon distillate such as mineral spirits, inhibited aluminum leafing pigment dispersed in a hydrophilic media such as isopropanol, and leafing mica dispersed in water. The preferred filler material is comprised of from about 78 to about 82% by weight inhibited aluminum leafing pigment dispersed in mineral spirits and is available from Siberline Manufacturing Co., Inc., Lincoln Drive, Tamaqua, Pa., under the product name Aquapaste 205-5. The most preferred filler material is comprised of from about 66 to about 70% by weight inhibited aluminum leafing pigment dispersed in isopropanol and is available from Siberline Manufacturing Co. under the product designation L-1959-PA.

The water soluble nonionic surfactant of the present inventive coating composition improves the wetting of the coating composition thereby helping filler material or pigment dispersion and inhibiting foam. These surfactants are also useful for reducing surface tension in the coating. Examples of suitable surfactants are acetylenic glycol, octylphenol ethoxylate, as well as many other surfactants which are well known in the coatings art. The preferred surfactant is a water soluble, liquid, nonionic octylphenol ethoxylate available from Union Carbide Chemicals and Plastics Company, Inc., Danbury, Ct. under the product name Triton® Nonionic Surfactant X-100. The most preferred surfactant is a water soluble nonionic acetylenic glycol available from Air Products and Chemicals, Inc., Performance Chemicals, 7201 Hamilton Boulevard, Allentown, Pennsylvania, under the product name Surfynol 465.

Those skilled in the art will recognize that the water used as the solvent in the present inventive coating composition is preferably distilled or deionized water.

The preferred coating composition of the present invention comprises (i) from 39.6 to 67.3% by weight of a phenylmethyl silicone resin emulsion having a total weight percent silicone resin solids content of approximately 48 to 72%; (ii) from 8.3 to 19.2% by weight of inhibited aluminum leafing pigment dispersed in either mineral spirits or isopropanol; (iii) from 0.05 to 3.0% by weight of water soluble nonionic acetylenic glycol; and (iv) from 10.5 to 52.0% by weight water, and has a total weight percent solids content of approximately 34.4 to 50.0 %.

The most preferred coating composition comprises (i) from 53.4 to 59.0% by weight of a phenylmethyl silicone resin emulsion having a total weight percent silicone resin solids content of approximately 58 to 62%; (ii) from 14.6 to 16.2% by weight of inhibited aluminum leafing pigment dispersed in either mineral spirits or isopropanol; (iii) from 0.3 to 0.5% by weight of water soluble nonionic acetylenic glycol; and (iv) from 24.3 to 31.7% by weight water, and has a total weight percent solids content of approximately 43.7 to 48.3%.

In addition to the above components, the present inventive coating composition may advantageously contain some or all of the following ingredients, including antifoams, pH buffers, anti-rust agents, biocides, fungicides, antifreeze agents, etc. However, some such additives may have an adverse effect on the coating's durability, corrosion resistance, coating properties and/or resistance to high temperatures.

In preparing the coating composition of the present invention, water and surfactant are blended together and the surfactant is allowed to dissolve for at least thirty (30) minutes. A filler material is then added to the resulting water solution. Dispersion of the filler material in the water solution is achieved by gentle agitation of the solution with a paddle to break apart the large agglomerates. This is followed by ensuring that the filler material is completely covered by the water solution and allowing the filler material to fully disperse by soaking for approximately 24 to 72 hours. During this period, the dispersion is agitated at least twice per day. A letdown is then prepared by blending a silicone resin emulsion and water for approximately 15 to 20 minutes. The letdown is allowed to fully dissolve for approximately 24 to 72 hours. The dispersion is then added to the letdown and thoroughly blended. The resulting admixture is then allowed to fully disperse for at least 24 hours. As can be well understood by those skilled in the art, excessive stirring during preparation of the coating composition of the present invention is to be avoided.

In addition to the above description, the coating compositions of the present invention are further developed by reference to the illustrative, but not limiting, examples set forth below.

SPECIFIC EMBODIMENT

In the working examples set forth below, the following components were used:

Emulsion—an anionic water emulsion of a soft phenylmethyl silicone resin obtained from Dow Corning ® Corporation and having a product designation Dow Corning ® 1-0468 resin emulsion.

Filler—a water dispersible, inhibited aluminum leafing pigment having a fine particle size obtained from Siberline Manufacturing Co. and having a product name Aquapaste 205-5.

Surfactant—a water soluble nonionic acetylenic glycol with inherent low foaming characteristics obtained from Air Products and Chemicals, Inc. and having a product name Surfynol 465.

Water—deionized water.

COATING COMPOSITION PREPARATION

The inventive coating composition was prepared according to the following method: 76.7 grams (g.) of Water and 2.2 g. of Surfactant were blended and the Surfactant allowed to dissolve for about 30 minutes to form a water solution. 76.7 g. of Filler was then added to the water solution and the resulting dispersion gently agitated with a spatula to break apart the large agglomerates. Care was taken to ensure that the Filler was completely covered by the water solution and then the Filler was allowed to fully disperse by allowing it to soak for 24 hours, minimum. During this period, the dispersion was agitated twice per day. 281.5 g. of Emulsion and 63 g. of Water were then blended together for about 15 to 20 minutes to form the letdown. The dispersion was then added to the letdown, thoroughly blended, and allowed to fully disperse for approximately 24 hours.

The inventive coating composition prepared by the above procedure had the following approximate physical properties:

Filler to Resin Solids ratio: 1.0 to 2.7
Percent Solids: 46.0
pH at 25° C.: 6.8
Density: 1.13 g/cm$^3$
Viscosity (ASTM D 4212; No. 1 Zahn Cup): 32 sec.

EXAMPLES 1 TO 6

The coating composition prepared by the above procedure was then applied to test panels. The test panels were aluminum alloy panels having the commercial designations Al Alloy 3003-0 and Al Alloy 6061-T6, and measuring either 0.032×2.0×4.0 inch or 0.125×4.0×4.0 inch. The test panels were conversion treated prior to coating by dipping or immersing each test panel into a no rinse chromate conversion coating consisting of a combination of hexavalent and/or trivalent chromium, mineral acids, and organic or inorganic binding agents and available from Betz Metchem, Inc., 200A Precision Drive, Horsham, Pa. under the product name Permatreat 1900; blowing off the excess coating with an air jet; and curing the coating 2 hours, minimum at 121±14° C. The inventive coating composition was then applied to the cured conversion coated test panels by dipping or immersing the panels in the coating composition; allowing the excess coating to drain from the panels; and curing the coating composition 45±10 minutes at 300°±25° F., and then 60±10 minutes at 350°±25° F., and then 90±10 minutes at 550°±25° F.

The test panels were then subjected to a variety of tests, the identity of which and the results obtained therefrom, as set forth below in Table I.

TABLE I

| | | SUMMARY OF EXAMPLES 1 TO 6 | | |
|---|---|---|---|---|
| EXAMPLE | Al ALLOY TEST PANEL | PROPERTY | TEST METHOD/DESCRIPTION | RESULTS |
| 1 | 3003-0* | Thickness | Total thickness less substrate thickness | 0.0002 to 0.0004 inch |
| | | Hardness | ASTM D 3363 | Pencil hardness of F |
| | | Adhesion | ASTM D 3359, Test Method A except cuts parallel and ¼ inch apart. (Ref. FED-STD-141. Method 6301) | 5A, i.e., no peeling or removal |
| 2 | 3003-0* | Fluid Resistance | Appearance after exposure to Skydrol 500B-4 and TT-S-735, Type III at room temperature for 168 hours | No wrinkling, roughening, blistering, checking or crazing |
| 3 | 3003-0* | Corrosion Resistance | ASTM B 117, for 168 hours (Ref. MIL-STD-810, Method 509) | No evidence of corrosion |
| 4 | 3003-0* | Thermal Stability | Appearance, weight loss, and flexibility after exposure to air at 450° and 600° F. for 168 hours (Ref ASTM D 522, Test Method A, for resistance to cracking) | No evidence of flaking, crazing, or cracking after exposure and 90° bend weight loss = 5.7% (450° F.) weight loss = 17.2% (600° F.) |
| 5 | 3003-0* | Heat and Corrosion Resistance | Appearance after exposure to air at 500° F. for 72 hours followed by exposure to salt spray, per ASTM B 117, for 168 hours. | No evidence of cracking, blistering, flaking, crazing, corrosion, or deterioration |
| 6 | 6061-T6** | Abrasion Resistance | FED-STD-141, Method 6192, using 1000 gram load and CS-10 abrasive wheel. | Wear Index = 27 mg/100 cycles |

*Test panel measured 0.032 × 2.0 × 4.0 inch
**Test panel measured 0.125 × 4.0 × 4.0 inch The above-referenced Examples demonstrate that the coating composition of the present invention displays clearly acceptable properties for the intended application or uses thereof. In particular, the coating composition displays minimum thickness and viscosity so as to preclude core passage blockage of high temperature aluminum heat exchangers. Moreover, the composition displays abrasion resistance satisfactory to preclude sand and dust erosion and displays acceptable levels of heat and corrosion resistance.

Although this invention has been shown and described with respect to the specific embodiment thereof, it will be understood by those skilled in the art that various changes may be made without departing from the spirit and scope of the claimed invention.

Having thus described the invention, what is claimed is:

1. A water based silicone coating composition comprising:

a. from about 39.6 to about 67.3% by weight of a silicone resin emulsion;
b. from about 8.3 to about 19.2% by weight of a non-water reactive leafing filler material having a laminar structure;
c. from about 0.05 to about 3.0% by weight of a water soluble nonionic surfactant; and
d. from about 10.5 to about 52.0% by weight of water, wherein the sum of components a, b, c and d total 100% by weight.

2. The water based silicone coating composition of claim 1 wherein said silicone resin emulsion is comprised of:
a. at least one silicone resin having at least one attached organic side group selected from the group consisting of phenyl, methyl, trifluoropropyl and vinyl moieties;
b. an anionic surfactant effective for dispersing said resin in and for binding said resin to a water based emulsion; and
c. water;

wherein said emulsion has a total resin solids content of about 38 to 82% by weight based on the total weight of the emulsion; and wherein said emulsion has an average viscosity of from about 40 to about 180 centipoises.

3. The water based silicone coating composition of claim 2 wherein said silicone resin is selected from the group consisting of phenylmethyl silicone resins.

4. The water based silicone coating composition of claim 3 wherein said anionic surfactant is selected from the group consisting of sodium lauryl sulfate, sodium linear alkyl benzene sulfonate, triethanol amine linear alkyl benzene sulfonate, sodium alpha olefin sulfonate, ammonium alkyl phenol ethoxylate sulfate, ammonium lauryl ether sulfate, ammonium alkyl ether sulfate, dialkyl ester of sodium sulfosuccinic acid, sodium cumene sulfonate, and ammonium xylene sulfonate.

5. The water based silicone coating composition of claim 4 wherein said silicone resin emulsion is comprised of:
a. from 48 to 72% by weight phenylmethyl silicone resin;
b. from 0.01 to 1.0% by weight sodium lauryl sulfate; and
c. from 52 to 27% by weight water, wherein the sum of components a, b and c total 100% by weight.

6. The water based silicone coating composition of claim 1 wherein said filler material is in the form of a paste comprising a pigment having a laminar structure and a dispersant wherein said pigment is selected from the group consisting of aluminum leafing pigment and leafing mica, and wherein said dispersant is selected from the group consisting of mineral spirits, isopropanol and water.

7. The water based silicone coating composition of claim 6 wherein said filler material is comprised of from about 78 to 82% by weight aluminum leafing pigment dispersed in mineral spirits.

8. The water based silicone coating composition of claim 6 wherein said filler material is comprised of from about 66 to about 70% by weight aluminum leafing pigment dispersed in isopropanol.

9. The water based silicone coating composition of claim 1 wherein said water soluble nonionic surfactant is acetylenic glycol.

10. The water based silicone coating composition of claim 1 wherein said water soluble nonionic surfactant is octylphenol ethoxylate.

11. The water based silicone coating composition of claims 5, 7, 8, or 9 which comprises:
a. from 39.6 to 67.3% by weight of a silicone resin emulsion comprising:
i. from 48 to 72% by weight phenylmethyl silicone resin;
ii. from 0.01 to 1.0% by weight sodium lauryl sulfate; and
iii. from 52 to 27% by weight water,
wherein the sum of components i, ii and iii total 100% by weight;
b. from 8.3 to 19.2% by weight aluminum leafing pigment dispersed in isopropanol or aluminum leafing pigment dispersed in mineral spirits;
c. from 0.05 to 3.0% by weight water soluble nonionic acetylenic glycol; and
d. from 10.5 to 52.0% by weight water, wherein the sum of components a, b, c and d total 100% by weight.

12. The water based silicone coating composition of claim 11 which comprises:
a. from 53.4 to 59.0% by weight of a silicone resin emulsion comprising:
i. from 58 to 62% by weight phenylmethyl silicone resin;
ii. from 0.01 to 1.0% by weight sodium lauryl sulfate; and
iii. from 42 to 37% by weight water, wherein the sum of components i, ii and iii total 100% by weight;
b. from 14.6 to 16.2% by weight aluminum leafing pigment dispersed in isopropanol or aluminum leafing pigment dispersed in mineral spirits;
c. from 0.3 to 0.5% by weight water soluble nonionic acetylenic glycol; and
d. from 24.3 to 31.7% by weight water,
wherein the sum of components a, b, c and d total 100% by weight.

13. A process for producing a water based silicone coating composition wherein said composition comprises: from about 39.6 to about 67.3% by weight of a silicone resin emulsion; from about 8.3 to about 19.2% by weight of a non-water reactive leafing filler material having a laminar structure; from about 0.05 to about 3.0% by weight of a water soluble nonionic surfactant; and from about 10.5 to about 52.0% by weight of water, and wherein said process comprises:
a. blending water and said water soluble nonionic surfactant and allowing said surfactant to dissolve to form a water solution;
b. adding said non-water reactive leafing filler material having a laminar structure to said water solution and allowing said filler material to fully disperse to form a dispersion;
c. blending said silicone resin emulsion and water to form a diluted emulsion and allowing said diluted emulsion to fully dissolve; and
d. adding said dispersion to said dissolved diluted emulsion to form an admixture and allowing said admixture to fully disperse.

14. The process for producing a water based silicone coating composition of claim 13 wherein said silicone resin emulsion of said coating composition is comprised of:

a. at least one silicone resin having at least one attached organic side group selected from the group consisting of phenyl, methyl, trifluoropropyl and vinyl moieties;
b. an anionic surfactant effective for dispersing said resin in and for binding said resin to a water based emulsion; and
c. water;

wherein said emulsion has a total resin solids content of about 38 to 82% by weight based on the total weight of the emulsion; and wherein said emulsion has an average viscosity of from about 40 to about 180 centipoises.

15. The process for producing a water based silicone coating composition of claim 14 wherein said silicone resin is selected from the group consisting of phenylmethyl silicone resins.

16. The process for producing a water based silicone coating composition of claim 15 wherein said anionic surfactant is selected from the group consisting of sodium lauryl sulfate, sodium linear alkyl benzene sulfonate, triethanol amine linear alkyl benzene sulfonate, sodium alpha olefin sulfonate, ammonium alkyl phenol ethoxylate sulfate, ammonium lauryl ether sulfate, ammonium alkyl ether sulfate, dialkyl ester of sodium sulfosuccinic acid, sodium cumene sulfonate, and ammonium xylene sulfonate.

17. The process for producing a water based silicone coating composition of claim 16 wherein said silicone resin emulsion is comprised of:
a. from 48 to 72% by weight phenylmethyl silicone resin;
b. from 0.01 to 1.0% by weight sodium lauryl sulfate; and
c. from 52 to 27% by weight water, wherein the sum of components a,b and c total 100% by weight.

18. The process for producing a water based silicone coating composition of claim 13 wherein said filler material is in the form of a paste comprising a pigment having a laminar structure and a dispersant wherein said pigment is selected from the group consisting of inhibited aluminum leafing pigment and leafing mica and wherein said dispersant is selected from the group consisting of mineral spirits, isopropanol and water.

19. The process for producing a water based silicone coating composition of claim 18 wherein said filler material is comprised of from about 78 to 82% by weight aluminum leafing pigment dispersed in mineral spirits.

20. The process for producing a water based silicone coating composition of claim 18 wherein said filler material is comprised of from about 66 to about 70% by weight aluminum leafing pigment dispersed in isopropanol.

21. The process for producing a water based silicone coating composition of claim 13 wherein said water soluble nonionic surfactant is acetylenic glycol.

22. The process for producing a water based silicone coating composition of claim 13 wherein said water soluble nonionic surfactant is octylphenol ethoxylate.

23. The process for producing a water based silicone coating composition of claims 17, 19, 20 or 21 wherein said coating composition comprises:
a. from about 39.6 to about 67.3% by weight of a silicone resin emulsion comprising:
   i. from 48 to 72% by weight phenylmethyl silicone resin;
   ii. from 0.01 to 1.0% by weight sodium lauryl sulfate; and
   iii. from 52 to 27% by weight water, wherein the sum of components i, ii, and iii total 100% by weight;
b. from about 8.3 to about 19.2% by weight aluminum leafing pigment dispersed in isopropanol or aluminum leafing pigment dispersed in mineral spirits;
c. from about 0.05 to about 3.0% by weight water soluble nonionic acetylenic glycol; and
d. from about 10.5 to about 52.0% by weight water, wherein the sum of components a, b, c and d total 100% by weight.

24. The process for producing a water based silicone coating composition of claim 23 wherein said coating composition comprises:
a. from about 53.4 to about 59.0% by weight of a silicone resin emulsion comprising:
   i. from 58 to 62% by weight phenylmethyl silicone resin;
   ii. from 0.01 to 1.0% by weight sodium lauryl sulfate; and
   iii. from 42 to 37% by weight water, wherein the sum of components i, ii and iii total 100% by weight;
b. from about 14.6 to about 16.2% by weight aluminum leafing pigment dispersed in isopropanol or aluminum leafing pigment dispersed in mineral spirits;
c. from about 0.3 to about 0.5% by weight water soluble nonionic acetylenic glycol; and
d. from about 24.3 to about 31.7% by weight water, wherein the sum of components a, b, c and d total 100% by weight.

* * * * *